(12) United States Patent
Muramatsu et al.

(10) Patent No.: US 7,497,630 B2
(45) Date of Patent: Mar. 3, 2009

(54) SEALED ROLLING BEARING

(75) Inventors: Makoto Muramatsu, Iwata (JP); Daisuke Kunimatsu, Iwata (JP)

(73) Assignee: NTN Corporation (JP)

( * ) Notice: Subject to any disclaimer, the term of this patent is extended or adjusted under 35 U.S.C. 154(b) by 336 days.

(21) Appl. No.: 10/577,783

(22) PCT Filed: Oct. 22, 2004

(86) PCT No.: PCT/JP2004/015711

§ 371 (c)(1), (2), (4) Date: Apr. 28, 2006

(87) PCT Pub. No.: WO2005/040626

PCT Pub. Date: May 6, 2005

(65) Prior Publication Data
US 2007/0031077 A1    Feb. 8, 2007

(30) Foreign Application Priority Data

Oct. 28, 2003   (JP) .............................. 2003-367307
Jan. 9, 2004    (JP) .............................. 2004-004245

(51) Int. Cl.
*F16C 33/76*   (2006.01)
*F16C 33/72*   (2006.01)
*F16J 15/34*   (2006.01)

(52) U.S. Cl. ...................... 384/477; 384/484; 277/402

(58) Field of Classification Search ............... 384/448, 384/470, 477–478, 480–486, 526, 531; 277/317, 277/402, 411, 423

See application file for complete search history.

(56) References Cited

U.S. PATENT DOCUMENTS 5,037,213 A * 8/1991 Uchida et al. ............... 384/484

(Continued)

FOREIGN PATENT DOCUMENTS

DE      195 27 340 A1   2/1996

(Continued)

OTHER PUBLICATIONS

Microfilm of the specification and drawings annexed to the request of Japanese Utility Model Application No. 117490/1981 (Laid-open No. 22519/1983); NSK Ltd., et al., Feb. 12, 1983.

*Primary Examiner*—Marcus Charles
(74) *Attorney, Agent, or Firm*—Harness, Dickey & Pierce, P.L.C.

(57) ABSTRACT

A sealed rolling bearing has sealing devices with both the functions of high sealing ability and small sliding resistance, which are antipodal to each other. The sealed rolling bearing has an outer member (1, 30) formed with an outer raceway surface (8, 29) on its inner circumferential surface. An inner member (4, 5, 32) is formed with an inner raceway surface (9a, 9b, 31) on its outer circumferential surface. The inner raceway surface (9a, 9b, 31) is arranged opposite to the outer raceway surface (8, 29). Rolling elements (10, 34) are freely rollably contained between the outer and inner raceway surfaces. Sealing devices (12, 13, 35) are arranged in an annular space formed between the outer and inner members (1, 30 and 4, 5, 32). Each of the sealing devices (12, 13; 35) has elastic sealing lips (27a~27c, 23~25, 37a, 37b). The maximum height Ry or Rmax of the surface roughness of a sliding surface of a member of the rotational side (18, 4, 32), which the sealing lips (27a~27c, 23~25, 37a, 37b) slidingly contact, is limited to a value of 2.0 μm or less. The run-out of the sliding surface, normal thereto, is limited to a value of 30 μm or less.

5 Claims, 6 Drawing Sheets

U.S. PATENT DOCUMENTS

| | | | |
|---|---|---|---|
| 5,454,647 A * | 10/1995 | Otto | 277/402 |
| 5,607,240 A * | 3/1997 | Kajihara et al. | 384/484 |
| 5,803,617 A * | 9/1998 | Ohnuki et al. | 384/486 |
| 5,947,611 A * | 9/1999 | Nagase | 384/448 |
| 6,669,373 B2 * | 12/2003 | Ohtsuki et al. | 384/486 |
| 6,682,076 B1 * | 1/2004 | Hosoda et al. | 277/402 |
| 6,719,459 B1 * | 4/2004 | Gotoh | 384/482 |
| 6,776,531 B2 * | 8/2004 | Tsuchida et al. | 384/484 |
| 6,817,769 B2 * | 11/2004 | Johnson et al. | 384/478 |

FOREIGN PATENT DOCUMENTS

| | | | |
|---|---|---|---|
| EP | 1424496 A1 * | 6/2004 | |
| JP | 08-035524 A | | 2/1996 |
| JP | 08-074865 A | | 3/1996 |
| JP | 08-296658 A | | 11/1996 |
| JP | 11044702 A * | | 2/1999 |
| JP | 2001-289257 A | | 10/2001 |
| JP | 2003057070 A * | | 2/2003 |
| JP | 2003-148483 A | | 5/2003 |
| JP | 2003-148626 A | | 5/2003 |
| JP | 2003-184897 | | 7/2003 |
| JP | 2004-142722 A | | 5/2004 |
| JP | 2006022904 A * | | 1/2006 |

* cited by examiner

SEALED ROLLING BEARING

CROSS-REFERENCE TO RELATED APPLICATIONS

This application is a National Stage of International Application No. PCT/JP2004/015711, filed Oct. 22, 2004, which claims priority to Japanese Patent Application No. 2003-367307, filed Oct. 28, 2003 and Japanese Patent Application No. 2004-004245, filed Jan. 9, 2004. The disclosures of the above applications are incorporated herein by reference.

FIELD

The present invention relates to a sealed rolling bearing used in automobiles, motors in general use etc., and, more particularly, to a sealed roller bearing used under circumstances where a great deal of water, muddy water and many other foreign matter exist.

BACKGROUND

In general, sealed roller bearings, with high sealability, prevent ingress of rain water or dusts into the inside of the bearing. The bearings are used, for example, as bearings for the suspension of automobiles. This is due to the fact that these bearings are usually exposed to severe conditions which contain muddy water, dusts etc. On the other hand, such a rolling bearing is required to have a small rotational torque since a large rotational torque on the bearing causes adverse influence to bearing temperature rise and fuel consumption. Since the sliding resistance of the seals is a major factor that influences an increase in the rotational torque of the bearing, it is desirous to provide a sealed rolling bearing that has not only a high sealability but a small sliding resistance.

One representative example of such a bearing for an automobile is described with reference to FIG. 1. FIG. 1 shows a first embodiment of the present disclosure. This bearing is used for a driving wheel of an automobile. The bearing includes an outer member integrally formed with a body mounting flange on its outer circumference. The flange is adapted to be mounted on a body (not shown) of the automobile. The outer member is also formed with double row outer raceway surfaces on its inner circumferential surface. A wheel hub has an integrally formed wheel mounting flange on one of its end to mount a wheel (not shown). One inner raceway surface is formed on the outer circumferential surface of the wheel hub. The inner raceway surface is arranged opposite to one of the double row outer raceway surfaces. A cylindrical portion, of a smaller diameter, axially extends from the inner raceway surface. The cylinder portion includes serrations formed on its inner circumferential surface to transmit torque. An inner ring is adapted to be fitted on the cylindrical portion and the inner ring includes the other inner raceway surfaces formed on its outer circumferential surface.

Double row rolling elements (balls) are arranged between the double row outer and inner raceway surfaces. The balls are freely rollably held by cages. Sealing devices are arranged at both ends of the outer member within an annular space formed by an inner member (including the wheel hub and the inner ring) and the outer member. The sealing devices prevent leakage of grease contained within the bearing as well as ingress of rain water or dusts into the inside of the bearing.

The sealing device on the inboard side, arranged between the outer member and the inner ring, includes a sealing ring with a metal core. The metal core has a substantially L-shaped cross-section and is fit into the outer member. A sealing member is integrally adhered, via vulcanized adhesion, onto the metal core. A slinger, having a similar L-shaped cross-section, is fit onto the inner ring. The sealing member is made of an elastic material, such as rubber, and has three sealing lips, an outer sealing lip, a middle sealing lip and an inner sealing lip. The tip edge of the outer sealing lip is in sliding contact with an inner side of an upstanding portion of the slinger. The tip edges of the middle sealing lip and the inner sealing lip are in sliding contact with a cylindrical portion of the slinger.

The sealing device, on the outboard side, has an annular metal core and a sealing member integrally adhered, via vulcanized adhesion, on the metal core 26. The sealing member is made of elastic material, such as rubber, and has three sealing lips. The tip edges of the three sealing lips are in direct sealing contact with the surface of the wheel hub.

In the sealing devices of the bearing for a wheel of a vehicle of the prior art, the slinger of the sealing device on the inboard side has a surface roughness of a sliding surface on which the sealing lips sliding contact which is limited to a value at the center line average height (Ra) at 0.3 μm or less and to a value at the maximum height (Ry) at 1.2 μm or less. Thus, foreign materials cannot easily enter into the inside of the bearing. This is due to the difficulty to generate a small gap at the maximum height portions and damages which would be otherwise caused at rolling contact portions by change in the properties of the grease (see Japanese Laid-open Patent Publication No. 184897/2003).

However, in order to limit the surface roughness of a sliding surface to which the sealing lips sliding contact to the value at the center line average height (Ra) at 0.3 μm or less and to the value at the maximum height (Ry) at 1.2 μm or less, it is necessary, previously, to press sheet members having the target surface roughness or to carry out lapping of the surfaces of sheet members after the pressing process. In fact, since availability of the plate member with such a target surface roughness is difficult, it is state of art, in view of its manufacturing cost, to carry out lapping of the surfaces of the sheet members after the pressing process.

Such a lapping of the surface of the slinger makes its handling very difficult, increases the number of processing steps, and further causes deformation of the surface of the slinger. Such a deformation of the sliding surface of the slinger causes variation of the interference of the sealing member. This reduces the following ability of the sealing lips and accordingly reduces the sealing of the bearing.

SUMMARY

It is, therefore, an object of the present disclosure to provide a sealed rolling bearing with sealing devices which provide both functions of high sealability and small sliding resistance, which are antipodal to each other.

To achieve the object mentioned above, a sealed rolling bearing comprises an outer member with outer raceway surfaces formed on its inner circumferential surface. An inner member is formed with inner raceway surfaces on its outer circumferential surface. The inner raceway surface is arranged opposite to the outer raceway surface. Rolling elements are freely rollably contained between the outer and inner raceway surfaces. Sealing devices are arranged in an annular space formed between the outer and inner members. Each of the sealing devices has sealing lips formed from an elastic member. The maximum height Ry or Rmax of the surface roughness of a sliding surface of a member of the rotational side which the sealing lips sliding contact is limited to a value of 2.0 μm or less. The run-out of the sliding surface, normal thereto, is limited to a value of 30 μm or less.

Since each of the sealing devices has sealing lips formed from an elastic member and the maximum height Ry or Rmax of the surface roughness of the sliding surface of a member of the rotational side which the sealing lips sliding contact is limited to a value of 2.0 μm or less, and the run-out of the sliding surface normal thereto is limited to a value of 30 μm or less, it is possible to suppress the absolute irregularities of the sliding surface to a small variation. Also, it is possible to suppress variation of the interference without increasing the interference of the sealing member. This avoids the problem of deformation of the sliding surface which is caused by the lapping of the slinger. Accordingly, it is possible to stabilize the following ability of the sealing lips relative to the sliding surface and thus further improve the sealability.

It is preferable that the sealing device includes a sealing ring mounted on a member of the stationary side and a slinger mounted on a member of the rotational side. The sealing lips, forming the sealing ring, are in sliding contact with the slinger. This structure makes it unnecessary to strictly restrict the target surface roughness by applying a lapping process to the sliding surface after the pressing process. Thus, it is possible to improve the sealability by only setting the run-out of the sliding surface at a predetermined value.

Also, the sealing device includes a sealing ring mounted on a member of the stationary side, side lips and a radial lip. The sealing lips are in direct sliding contact with the member of the rotational side. This structure makes it possible to easily carry out surface machining, such as grinding or lapping, of the sliding surface after heat treatment even if the target surface roughness and the run-out are not obtained.

Further, the sealing device includes a sealing ring mounted on a member of the stationary side, a main lip and a sub lip. The main lip is in direct sliding contact with a sealing groove formed on a member of the rotational side. The sealing groove has a substantially U-shaped cross-section. The sub lip is in sliding contact with a ridge of the sealing groove, via a small interference. This structure makes it possible to increase the interference, while keeping the sealing ability, due to the following ability of the sub lip when the main lip wears. Accordingly, it is possible to suppress the rotational torque of the bearing during a small amount of wear of the main lip as well as to obtain the sealing ability due to an increase of interference in accordance with the wear of the main lip.

Also, preferably the maximum height Ry or Rmax of the surface roughness of the sliding surface is limited to a value of 1.2 μm or less. The run-out of the sliding surface, normal thereto, is limited to a value of 10 μm or less. This provides a sealed rolling bearing with sealing devices which has both functions of high sealing ability and small sliding resistance, which are opposite to each other.

The sealed rolling bearing includes an outer member formed with outer raceway surface on its inner circumferential surface with outer raceway surface. An inner member is formed with an inner raceway surface on its outer circumferential surface. The inner raceway surface is arranged opposite to the outer raceway surface. Rolling elements are freely rollably contained between the outer and inner raceway surfaces. Sealing devices are arranged in an annular space formed between the outer and inner members. Each of the sealing devices has elastic member sealing lips. The maximum height Ry or Rmax of the surface roughness of a sliding surface of a member on the rotational side, which the sealing lips sliding contact, is limited to a value of 2.0 μm or less. The run-out of the sliding surface, normal thereto, is limited to a value of 30 μm or less. This makes it possible to suppress the absolute irregularities of the sliding surface to a small variation as well as to suppress variation of the interference without increasing the interference of the sealing member. Thus, this avoids the problem of deformation of the sliding surface which is caused by lapping of the slinger. Accordingly, it is possible to stabilize the following ability of the sealing lips relative to the sliding surface and to further improve its sealing ability.

A sealed rolling bearing includes an outer member with outer raceway surface formed on its inner circumferential surface; an inner member formed with inner raceway surface on its outer circumferential surface arranged opposite to the outer raceway surface; rolling elements freely rollably contained between the outer and inner raceway surfaces; and sealing devices arranged in an annular space formed between the outer and inner members. Each of the sealing devices has elastic member sealing lips. The maximum height Ry or Rmax of the surface roughness of a sliding surface of a member of the rotational side, which the sealing lips sliding contact, is limited to a value of 2.0 μm or less. The run-out of the sliding surface, normal thereto is limited to a value of 30 μm or less.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

Preferred embodiments of the present invention will be described with reference to accompanied drawings.

Figure 1:
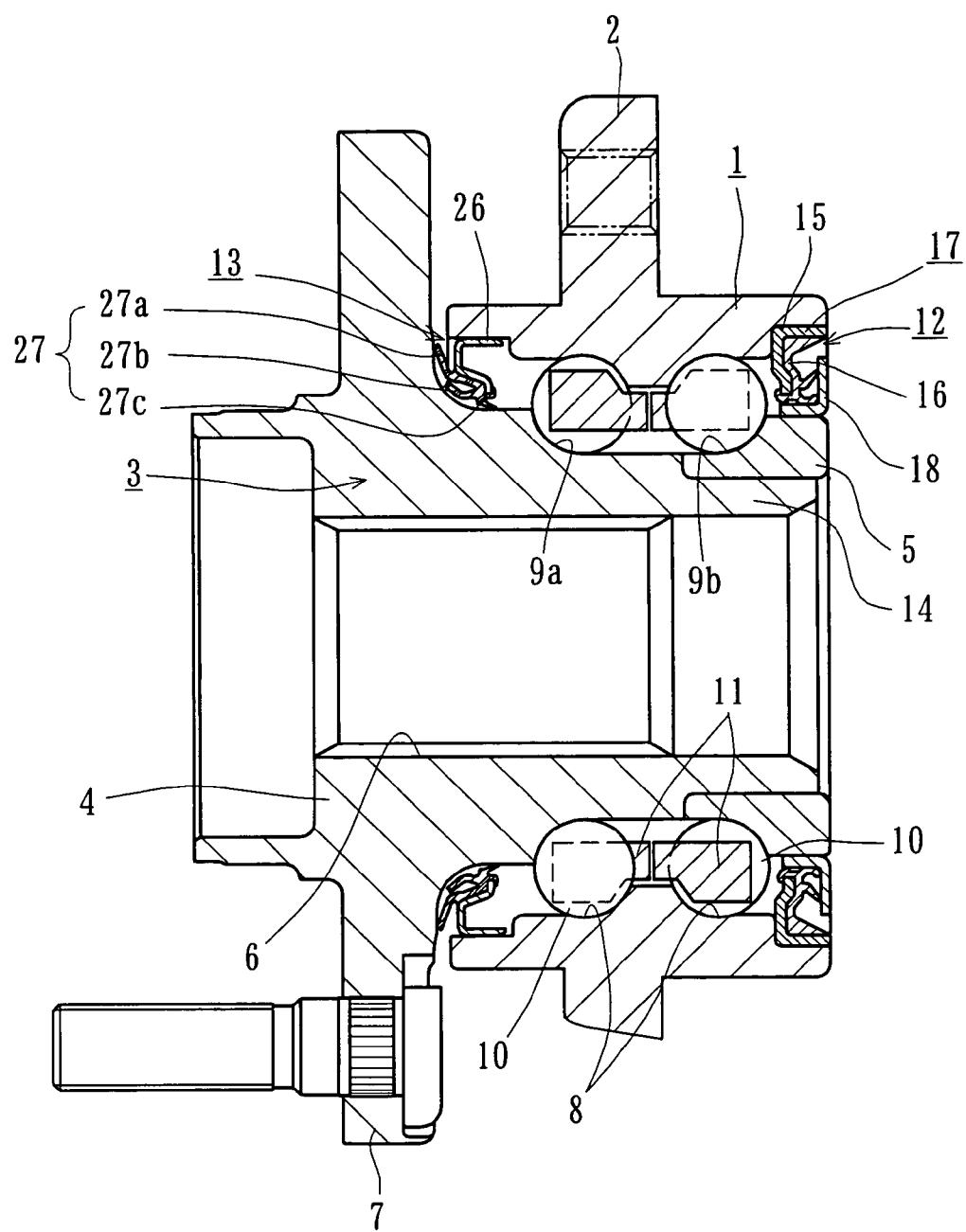
FIG. 1 is a longitudinal-section view of a first embodiment of a sealed rolling bearing according to a first embodiment.

FIG. 1 is a longitudinal-section view of a first embodiment of a sealed roller bearing. The sealed rolling bearing shown in FIG. 1 is an example applied to a driving wheel of a vehicle for rotatably supporting the wheel in a suspension of the vehicle. Since the fundamental structure of the bearing provided with the sealing devices previously mentioned has been described at the beginning of this specification using FIG. 1, characteristic portions of the bearing will be mainly described hereinafter.

Sealing devices 12 and 13 are arranged at either ends of an annular space formed between the outer member 1 and inner member 3, comprised of the wheel hub 4 and the inner ring 5 which form a member of the rotational side. The outer member 1 forms a member of the stationary side. The sealing devices 12 and 13 prevent leakage of grease contained within the bearing as well as ingress of rain water or dusts into the inside of the bearing.

Figure 2:
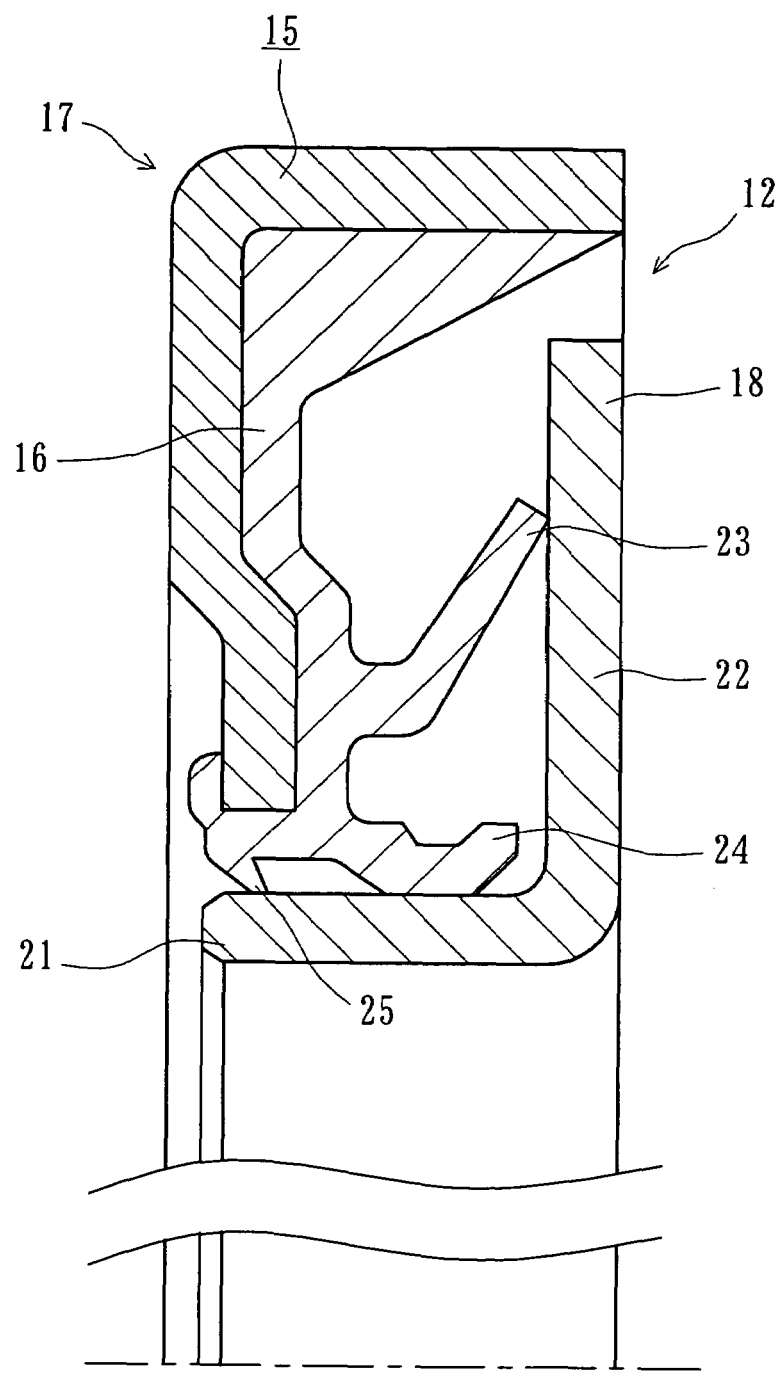
FIG. 2 is a partially enlarged sectional view of the sealing device of the inboard side of the sealed rolling bearing according to the first embodiment.

The sealing device 12 mounts between the outer member 1 and the inner wheel 5 on the inboard side (the right hand side in FIG. 1). The sealing device 12, as shown in FIG. 2, includes a sealing ring 17 with a metal core 15. The metal core 15 has a substantially L-shaped cross-section. The sealing device 12 is fit into the outer member 1. A sealing member 16 is integrally adhered, via vulcanized adhesion, onto the metal core 15. A slinger 18, with a similar L-shaped cross-section, is fit onto the inner ring 5. The slinger 18 and the metal core 15 are made by press forming of austenitic stainless steel sheet (JIS SUS 304 etc.) or preserved cold rolled sheet (JIS SPCC etc.).

The sealing member 16 is made of an elastic material such as rubber and includes three sealing lips, an outer sealing lip 23, a middle sealing lip 24 and an inner sealing lip 25. The tip edge of the outer sealing lip 23 sliding contacts an inner side of an upstanding portion 22 of the slinger 18. The tip edges of the middle sealing lip 24 and the inner sealing lip 25 are in sliding contact with cylindrical portion 21 of the slinger 18. The surface roughness of a sliding surface of the slinger 18, which the sealing lips 23, 24 and 25 are in sliding contact with, is limited to a value of 2.0 µm or less, and preferably at 1.2 µm or less at the maximum height Ry or Rmax. The run-out of the sliding surface, normal thereto, is limited to a value of 30 µm or less, and preferably at 10 µm or less. Accordingly, it is unnecessary to strictly restrict the target surface roughness by applying a lapping process to the sliding surface after the pressing process as in the prior art. This is achieved only by setting the run-out of the sliding surface at a predetermined value.

Thus, it is possible to suppress the absolute irregularities of the sliding surface to a small variation as well as to suppress variation of the interference without increasing the interference of the sealing member. Thus, this avoids the problem of deformation of the sliding surface of the slinger 18 which is caused by lapping the slinger as in the prior art. Accordingly, it is possible to stabilize the following ability of the sealing lips 23, 24 and 25 relative to the sliding surface and to further improve the sealability.

Figure 3:
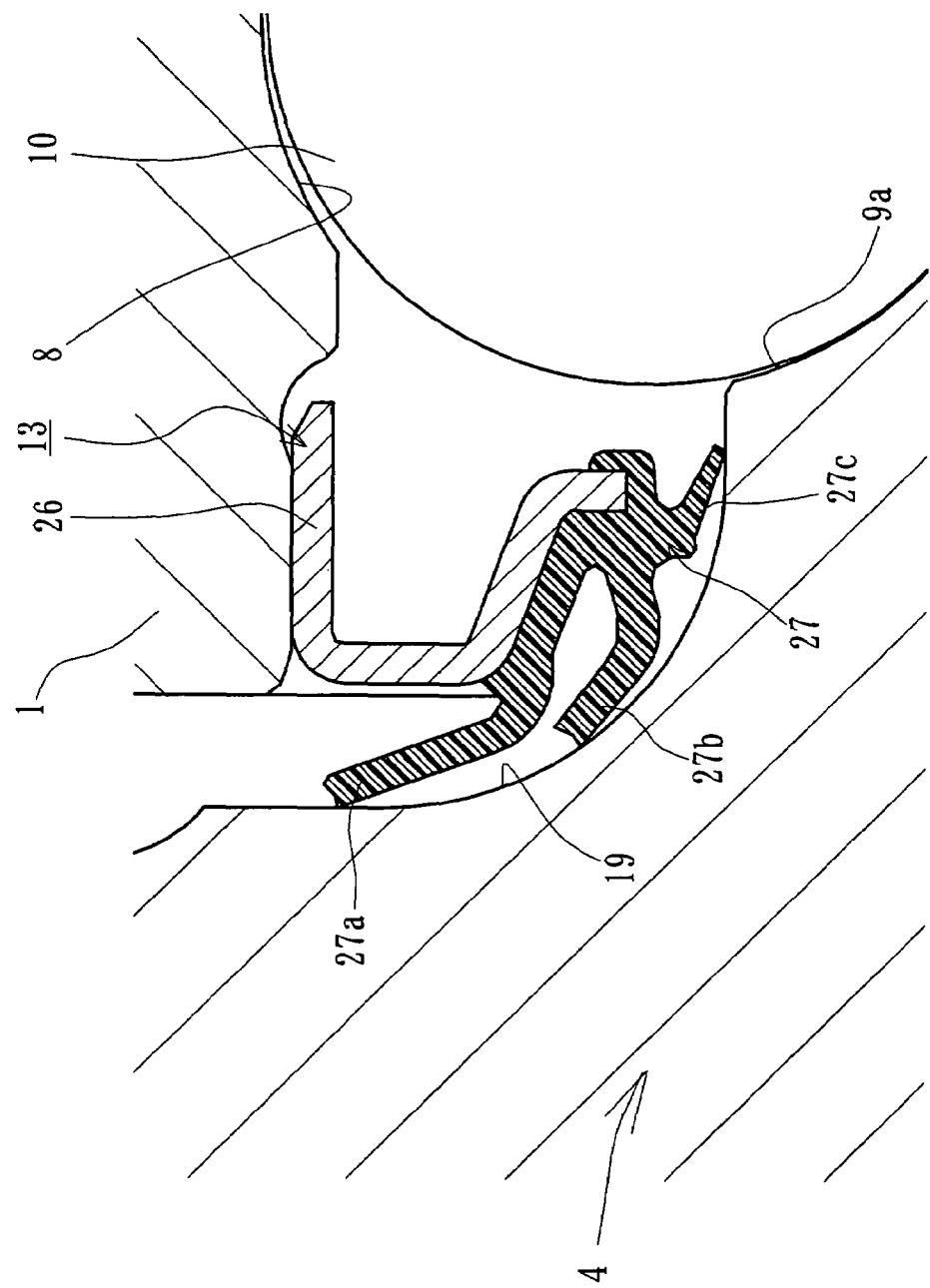
FIG. 3 is a partially enlarged sectional view of the sealing device of the outboard side of the sealed rolling bearing according to the first embodiment.

The sealing device 13 on the outboard side, as shown in FIG. 3, includes an annular metal core 26 and a sealing member 27 integrally adhered, via vulcanized adhesion, on the metal core 26. The metal core 26 is formed by press forming of austenitic stainless steel sheet (JIS SUS 303 etc.) or preserved cold rolled sheet (JIS SPCC etc.). The sealing member 27 is made of an elastic material, such as rubber, and includes two side lips (dust seal) 27a, 27b and one radial lip (grease seal) 27c. The tip edges of the sealing lips 27a~27c are in direct sliding contact with the surface of the wheel hub 4. The tip edges contact a sliding surface 19 on the base of the wheel mounting flange 7 on the inboard side.

The maximum height Ry or Rmax of the surface roughness of the sliding surface 19, which slidingly contacts the sealing lips 27a, 27b and 27c, is limited to a value of 2.0 µm or less, and preferably at 1.2 µm or less. The run-out of the sliding surface 19, normal thereto, is limited to a value of 30 µm or less, and preferably at 10 µm or less. If these target surface roughness or run-out cannot be obtained, a grinding or lapping process may be conducted on the sliding surface after it is heat treated.

Thus, similar to the sealing device 12, it is possible to suppress the absolute irregularities of the sliding surface 19 to a small variation as well as to suppress variation of the interference without increasing the interference of the sealing member. This avoids the problem of deformation of the sliding surface. Accordingly, it is possible to stabilize the following ability of the sealing lips 27a, 27b and 27c relative to the sliding surface 19 and to further improve its sealing ability.

Figure 4:
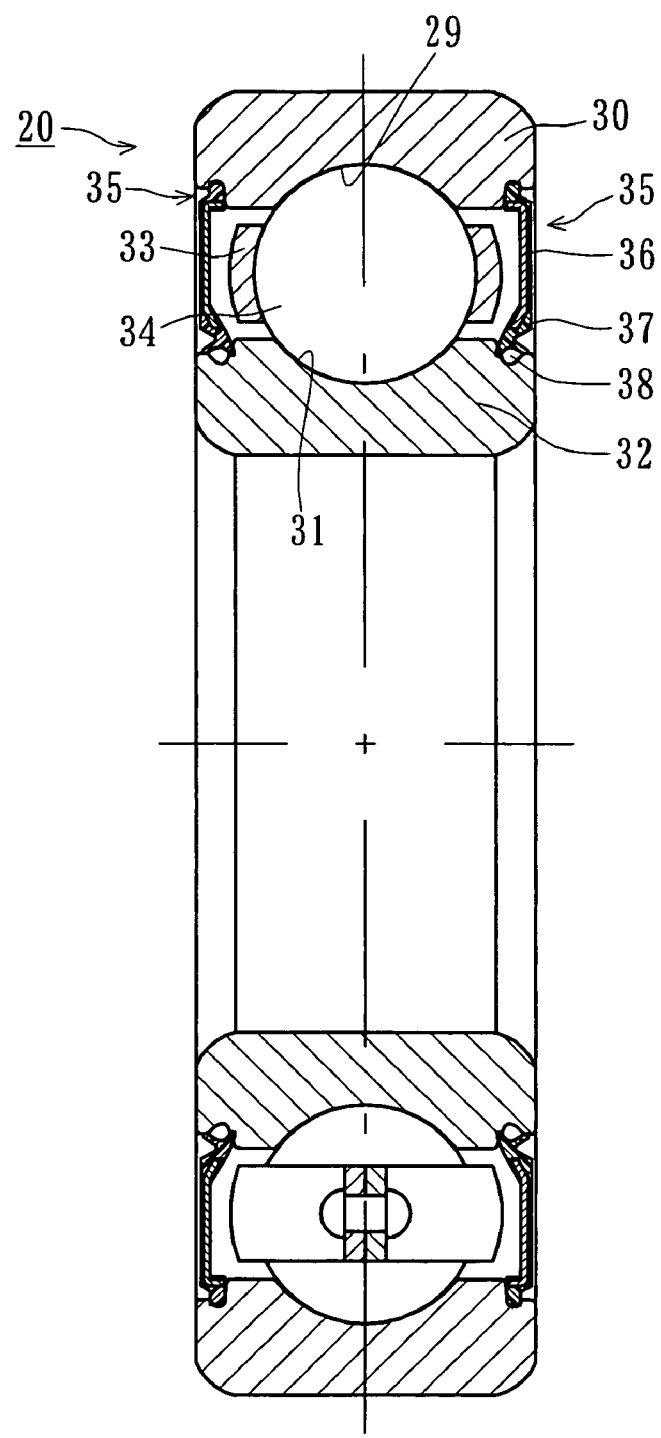
FIG. 4 is a longitudinal-section view of a sealed rolling bearing according to a second embodiment.
Figure 5:
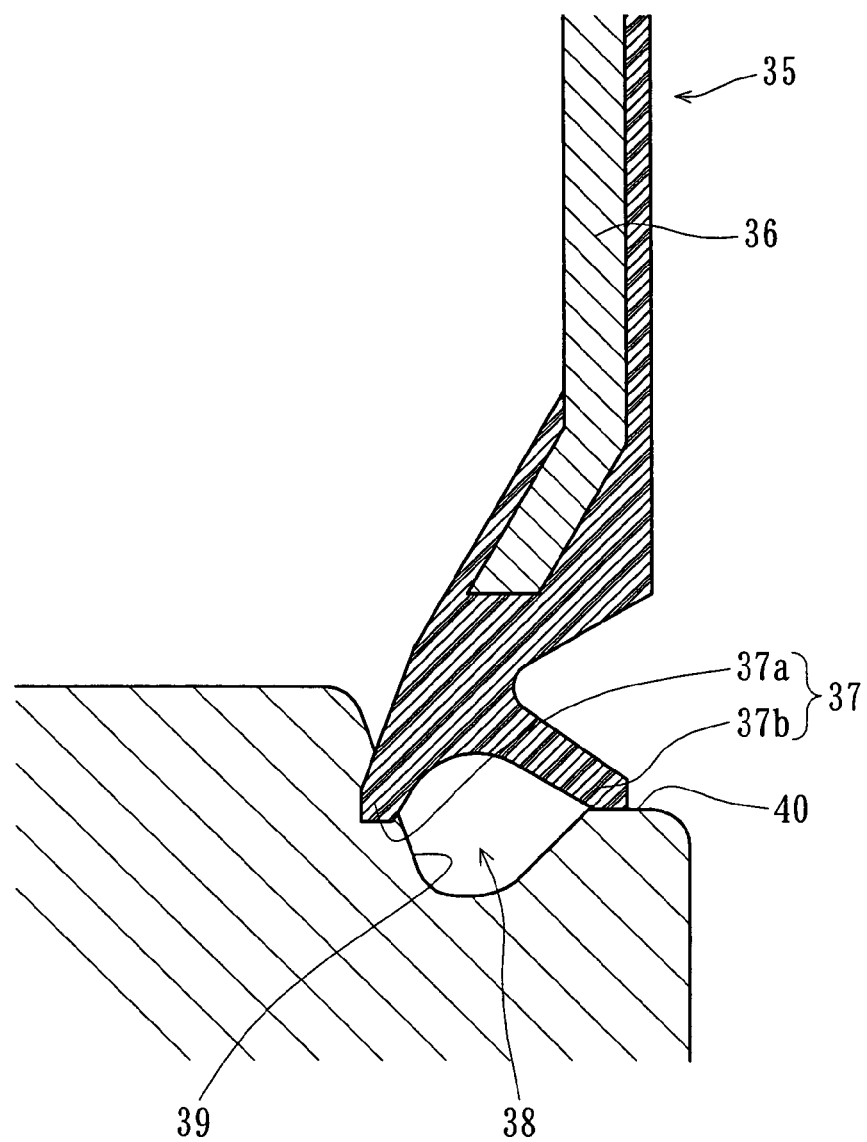
FIG. 5 is a partially enlarged sectional view of a sealing device of a second embodiment.

FIG. 4 is a longitudinal-section view of a sealed rolling bearing according to a second embodiment of the present disclosure. FIG. 5 is a partially enlarged sectional view of FIG. 4. The sealed rolling bearing 20, exemplary shown in FIG. 4, is a deep groove ball bearing. An outer ring 30 is formed with an outer raceway surface 29 on its inner circumferential surface. An inner ring 32 is formed with an inner raceway surface 31 on its outer circumferential surface. Balls 34 are contained and freely rollably held by a cage 33 between the outer and inner raceway surfaces 29 and 31. A pair of sealing rings 35 are arranged in an annular space formed between the outer and inner rings 30 and 32.

Each of the sealing rings 35 has a metal core 36 with flat annular configuration formed from cold rolled steel sheet (JIS SPCC etc.) by press forming. A sealing member 37 is integrally adhered, via vulcanized adhesion, onto the metal core 36. The sealing rings 35 are fit into the inner circumferential surface at both ends of the outer ring 30, via the sealing members 37. Each of the sealing members 37 is in direct sliding contact with a sealing groove 38. The sealing groove 38 has a substantially U-shaped cross-section formed at each end on the outer circumferential surface of the inner ring. A main lip 37a of the sealing member 37 contacts an inclined sliding surface 39 of the sealing groove 38. A sub lip 37b of the sealing member 37 contacts a ridge 40 of the sealing groove 38, via a small interface. The base of the sub lip 37b has a constricted cross-section. Thus, the sub lip 37b has a small flexural rigidity. Accordingly, the sub lip 37b can follow the motion of the main lip 37a and move toward the left hand direction (FIG. 5) in accordance with the wear of the main lip 37a. Thus, this increases the interference relative to the ridge 40. The sub lip 37b can suppress the rotational torque of the bearing during a small wearing amount of the main lip 37a and can ensure its sealing ability while increasing the interference relative to the ridge 40 in accordance with wear of the main lip 37a.

The maximum height Ry or Rmax of the surface roughness of at least the sliding surface 39 of the sealing groove 38, which the main sealing lip 37a slidingly contacts, is limited to a value of 2.0 µm or less, and preferably at 1.2 µm or less. The run-out of the sliding surface 39, normal thereto, is limited to a value of 30 µm or less, and preferably at 10 µm or less. If these target surface roughness or run-out cannot be obtained, a grinding or lapping process may be conducted on the sliding surface after it is heat treated.

Thus, it is possible to suppress the absolute irregularities of the sliding surface 39 to a small variation as well as to suppress variation of the interference without increasing the interference of the sealing member. Thus, this stabilizes the following ability of the sealing lip 37a relative to the sliding surface 39 and further improves its sealing ability.

Figure 6:
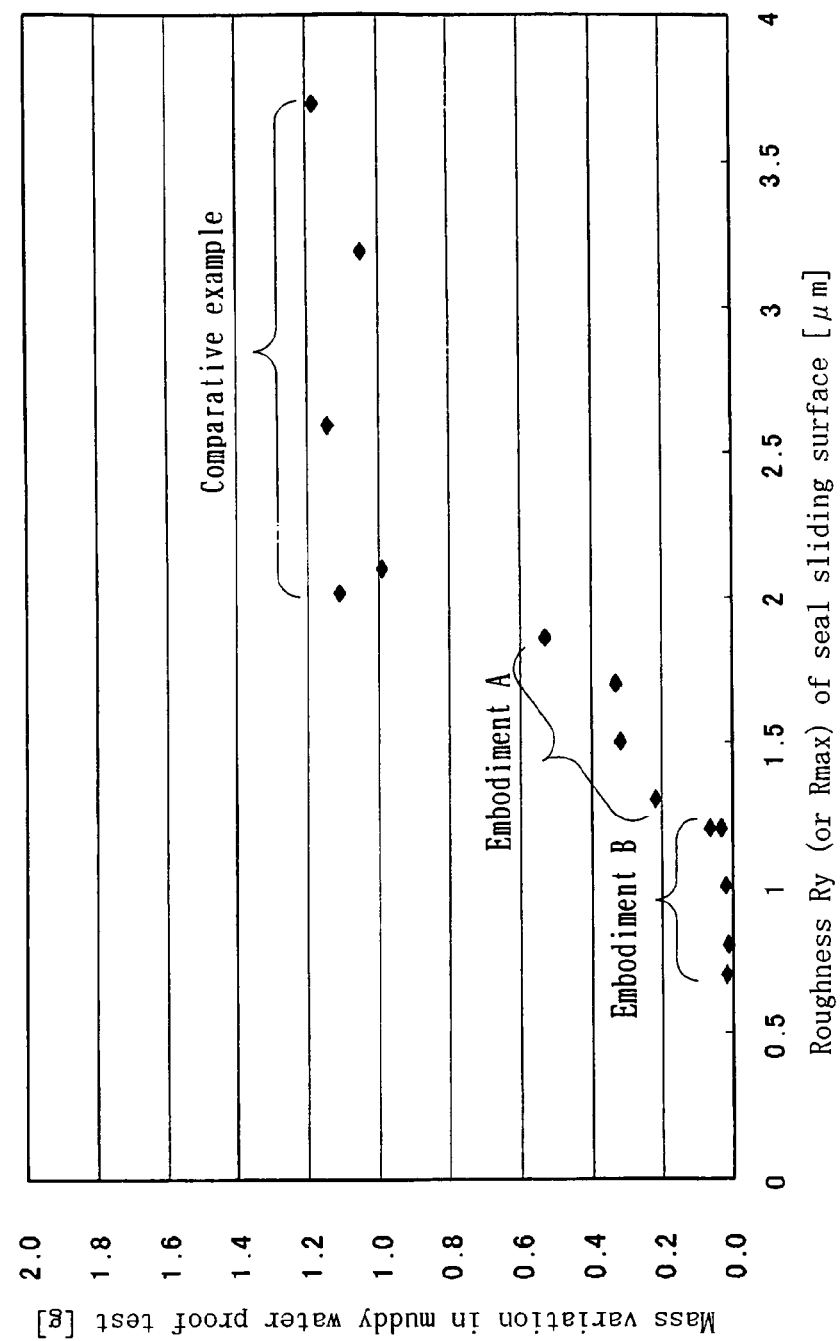
FIG. 6 is a graph showing results of mass variation in a muddy water proof test carried out by exposing a naked bearing, itself, to the muddy water.

FIG. 6 is a graph showing results of mass variation in a muddy water proof test carried out by exposing a naked bearing, itself, to the muddy water. This test was carried out by spraying Kanto foam JIS 8 mixed liquor onto samples of sealed rolling bearings of the present disclosure and the prior art during driving, and then measuring the mass variation before and after the test. As can be seen from FIG. 6, there are remarkable differences between sample 1 (Comparative example) having the maximum height Ry or Rmax of 2.02~3.7 µm and the run-out of 30 µm normal to the sliding surface 39, sample 2 (Embodiment A) having the maximum height Ry or Rmax of 1.3~1.86 µm and the run-out of 10~30

μm normal to the sliding surface 39, and sample 3 (Embodiment B) having the maximum height Ry or Rmax of 0.7~1.2 μm and the run-out of 10 μm or less normal to the sliding surface 39.

The sealed rolling bearing of the present disclosure can be applied to any type of sealed rolling bearings, irrespective of its bearing or sealing type, used under circumstances where a large amount of foreign matter, such as water or muddy water, exists.

The present disclosure has been described with reference to the preferred embodiment. Obviously, modifications and alternations will occur to those of ordinary skill in the art upon reading and understanding the preceding detailed description. It is intended that the present invention be construed to include all such alternations and modifications insofar as they come within the scope of the appended claims or their equivalents.

What is claimed is:

1. A sealed rolling bearing comprising:
    an outer member formed with at least one outer raceway surface on its inner circumferential surface;
    an inner member formed with at least one inner raceway surface on its outer circumferential surface, said inner raceway surface with inner raceway surface arranged opposite to the outer raceway surface;
    rolling elements freely rollably contained between the outer and inner raceway surfaces; and
    sealing devices arranged in an annular space formed between the outer and inner members, each of the sealing devices has sealing lips of an elastic member, said sealing lips being in sliding contact with a sliding surface of a member of a rotational side, the maximum height Ry or Rmax of the surface roughness of said sliding surface of the member of the rotational side is limited to a value of 2.0 μm or less, and the run-out of the sliding surface, is limited to a value of 30 μm or less.

2. The sealed rolling bearing of claim 1 wherein one of said sealing device mounted on a member of a stationary side and a slinger mounted on a member of the rotational side, and the sealing lips forming a sealing ring in sliding contact with the slinger.

3. The sealed rolling bearing of claim 1 wherein said sealing device mounted on a member of a stationary side, including sealing side lips and a radial lip, the sealing side and radial lips directly slidingly contact the member of the rotational side.

4. The sealed rolling bearing of claim 1 wherein said sealing device mounted on a member of a stationary side, includes a main lip and a sub lip, the main lip directly sliding contacts a sealing groove formed on a member of the rotational side, said sealing groove having a substantially U-shaped cross-section, and the sub lip slidingly contacts a ridge of the sealing groove via a small interference.

5. The sealed rolling bearing of claim 1 wherein the maximum height Ry or Rmax of the surface roughness of the sliding surface is limited to a value of 1.2 μm or less, and the run-out of the sliding surface, normal thereto, is limited to a value of 10 μm or less.

* * * * *